United States Patent
Hu et al.

(10) Patent No.: US 12,525,005 B2
(45) Date of Patent: Jan. 13, 2026

(54) METHOD AND SYSTEM OF MULTIPLE FACIAL ATTRIBUTES RECOGNITION USING HIGHLY EFFICIENT NEURAL NETWORKS

(71) Applicant: Intel Corporation, Santa Clara, CA (US)

(72) Inventors: Ping Hu, Beijing (CN); Anbang Yao, Beijing (CN); Xiaolong Liu, Beijing (CN); Yurong Chen, Beijing (CN); Dongqi Cai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 440 days.

(21) Appl. No.: 18/019,450

(22) PCT Filed: Sep. 25, 2020

(86) PCT No.: PCT/CN2020/117788
§ 371 (c)(1),
(2) Date: Feb. 2, 2023

(87) PCT Pub. No.: WO2022/061726
PCT Pub. Date: Mar. 31, 2022

(65) Prior Publication Data
US 2023/0290134 A1    Sep. 14, 2023

(51) Int. Cl.
*G06V 10/82* (2022.01)
*G06N 3/0464* (2023.01)
*G06V 10/77* (2022.01)
*G06V 40/16* (2022.01)

(52) U.S. Cl.
CPC ........... *G06V 10/82* (2022.01); *G06N 3/0464* (2023.01); *G06V 10/7715* (2022.01); *G06V 40/171* (2022.01)

(58) Field of Classification Search
CPC .. G06V 10/82; G06V 10/7715; G06V 40/171; G06V 40/168; G06V 40/174; G06V 40/178; G06N 3/0464; G06N 3/045; G06N 3/08
See application file for complete search history.

(56) References Cited

U.S. PATENT DOCUMENTS

2022/0277558 A1    9/2022  Li

FOREIGN PATENT DOCUMENTS

| CN | 103824054 | 5/2014 |
|---|---|---|
| CN | 106203395 | 12/2016 |
| CN | 106529402 | 3/2017 |
| CN | 109947960 | 6/2019 |

(Continued)

OTHER PUBLICATIONS

Christian Szegedy, Wei Liu, Yangqing Jia, Pierre Sermanet, Scott Reed, Dragomir Anguelov, Dumitru Erhan, Vincent Vanhoucke, Andrew Rabinovich; Proceedings of the IEEE Conference on Computer Vision and Pattern Recognition (CVPR), 2015, pp. 1-9. (Year: 2015).*

(Continued)

*Primary Examiner* — Ross Varndell
(74) *Attorney, Agent, or Firm* — Hanley, Flight & Zimmerman, LLC

(57) ABSTRACT

A method and system of multiple facial attributes recognition using highly efficient neural networks.

17 Claims, 10 Drawing Sheets

(56) References Cited

FOREIGN PATENT DOCUMENTS

| CN | 110678873 | | 1/2020 | |
|---|---|---|---|---|
| CN | 111339818 | | 6/2020 | |
| CN | 111339818 A | * | 6/2020 | ........... G06V 40/168 |
| WO | 2019183758 | | 10/2019 | |
| WO | 2021120028 A1 | | 6/2021 | |

OTHER PUBLICATIONS

Jie Hu, Li Shen, Gang Sun; Proceedings of the IEEE Conference on Computer Vision and Pattern Recognition (CVPR), 2018, pp. 7132-7141 (Year: 2018).*
Chim S, Lee JG, Park HH. Dilated Skip Convolution for Facial Landmark Detection. Sensors (Basel). Dec. 4, 2019;19(24):5350. doi: 10.3390/s19245350. PMID: 31817213; PMCID: PMC6960628. (Year: 2019).*
International Search Report and Written Opinion for PCT Application No. PCT/CN2020/117788, dated Jun. 23, 2021.
Dai, J.F., et al. , "Deformable Convolutional Networks" , arXiv preprint arXiv:1703.06211; 2017.
Gao, H., et al., "Deformable kernels: Adapting effective receptive fields for object deformation", arXiv preprint arXiv:1910.02940; 2019.
Gunther, M., et al. , "AFFACT—alignment free facial attribute classification technique", arXiv preprint arXiv: 1611.06158; 2016.
Han, H., et al., "Heterogeneous face attribute estimation: A deep multi-task learning approach", IEEE TPAMI, 2017.
Hand, E.M., et al., "Attributes for improved attributes: A multi-task network utilizing implicit and explicit relationships for facial attribute classification", AAAI, 2017.
He, K.M., et al., "Deep residual learning for image recognition", arXiv:1512.03385, 2015.
Howard, A.G., et al., "MobileNets: Efficient Convolutional Neural Networks for Mobile Vision Applications", https://arxiv.org/abs/1704.04861, Apr. 17, 2017.
Hu, J., et al., "Squeeze-and-Excitation Networks", arXiv preprint arXiv:1709.01507; 2017.
Hu, P., et al., "Learning supervised scoring ensemble for emotion recognition in the wild", ICMI, 2017.
Huang, G., et al., "Densely Connected Convolutional Networks", arXiv:1608.06993; 2016.
Kalayeh, M.M., et al. , "Improving facial attribute prediction using semantic segmentation", CVPR, 2017.
Kang, S., et al., "Face attribute classification using attribute-aware correlation map and gated convolutional neural networks", ICIP, 2015.
Krizhevsky, A., et al., "ImageNet Classification with Deep Convolutional Neural Networks", In Advances in Neural Information Processing systems (NIPS); pp. 1-9; 2012.
Lee, C.Y., et al., "Deeply-supervised nets", arXiv:1409.5185, 2014.
Li, D., et al., "HBONet: Harmonious Bottleneck on Two Orthogonal Dimensions", ICCV, 2019.
Liu, Z., et al., "Deep learning face attributes in the wild", ICCV, 2015.
Ma, N., et al., "Shufflenet v2: Practical guidelines for efficient cnn architecture design", ECCV, 2018.
Rudd, E.M., et al., "Moon: A mixed objective optimization network for the recognition of facial attributes", ECCV, 2016.
Sandler, M., et al., "Mobilenetv2: Inverted residuals and linear bottlenecks", CVPR (2018).
Xiao, T.J., et al., "The Application of Two-Level Attention Models in Deep Convolutional Neural Network for Fine-grained Image Classification", arXiv preprint arXiv:1411.6447; 2014.
Zhang, X., et al., "Shufflenet: An extremely efficient convolutional neural network for mobile devices", CVPR, 2018.
Zhong, Y., et al., "Face attribute prediction using off-the-shelf cnn features", Proceedings of the IEEE International Conference on Biometrics (ICB), pp. 1-7; IEEE (2016).
Zhong, Y., et al., "Leveraging mid-level deep representations for predicting face attributes in the wild", arXiv:1602.01827, 2016.
International Preliminary Report on Patentability for PCT Patent Application No. PCT/CN2020/117788, dated Apr. 6, 2023.

* cited by examiner

OBTAIN AT LEAST ONE IMAGE WITH AT LEAST ONE FACIAL REGION  102

RECOGNIZE MULTIPLE FACIAL ATTRIBUTES ON THE AT LEAST ONE FACIAL REGION USING A NEURAL NETWORK WITH AT LEAST TWO BLOCKS EACH HAVING AT LEAST ONE NETWORK LAYER  104

WHEREIN ONE OR MORE OF THE INDIVIDUAL BLOCKS HAVE AT LEAST ONE INDIVIDUAL LAYER WITH MULTIPLE KERNELS WITH VARYING SIZES, AND  106

WHEREIN ONE OR MORE INDIVIDUAL BLOCKS PERFORM AT LEAST ONE PER-BLOCK FRACTIONAL ATTENTION OPERATION  108

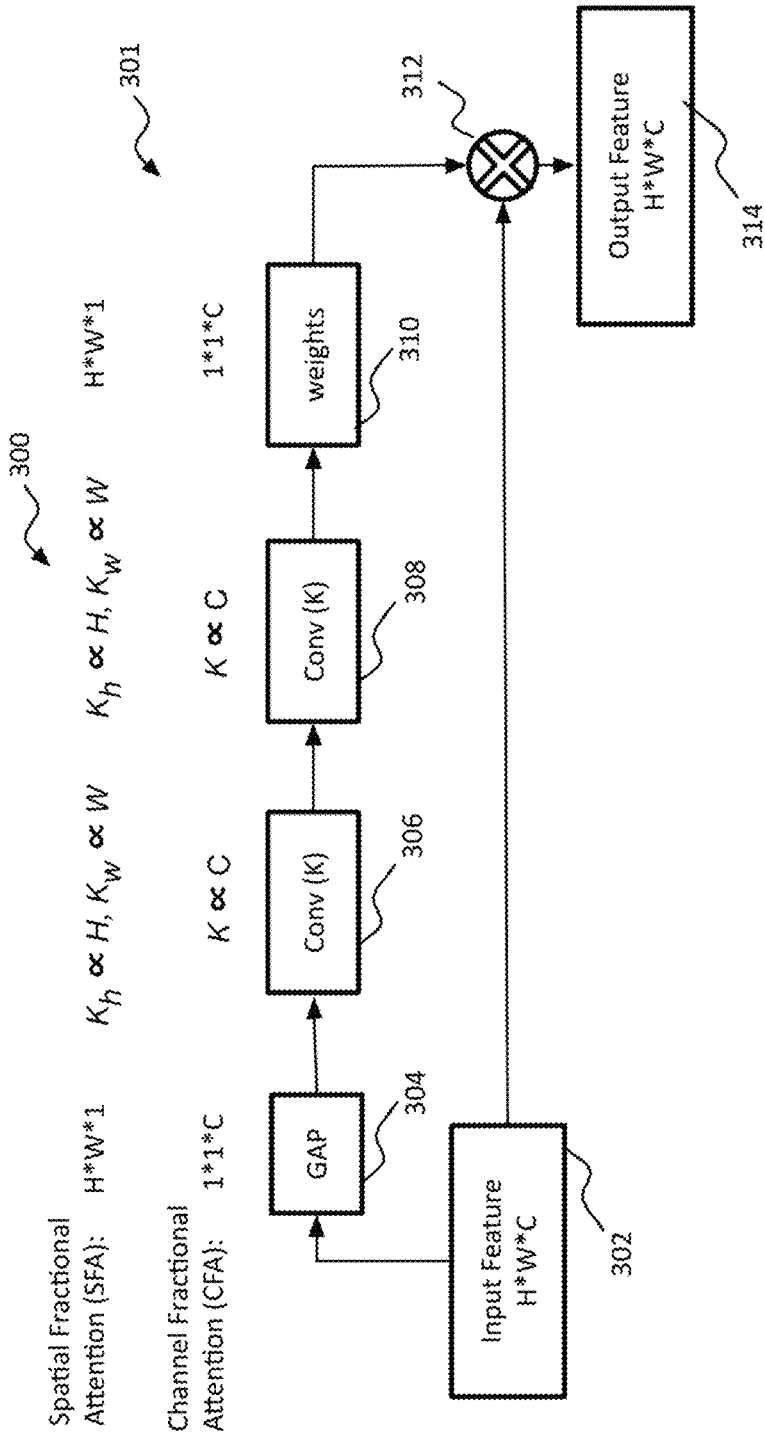

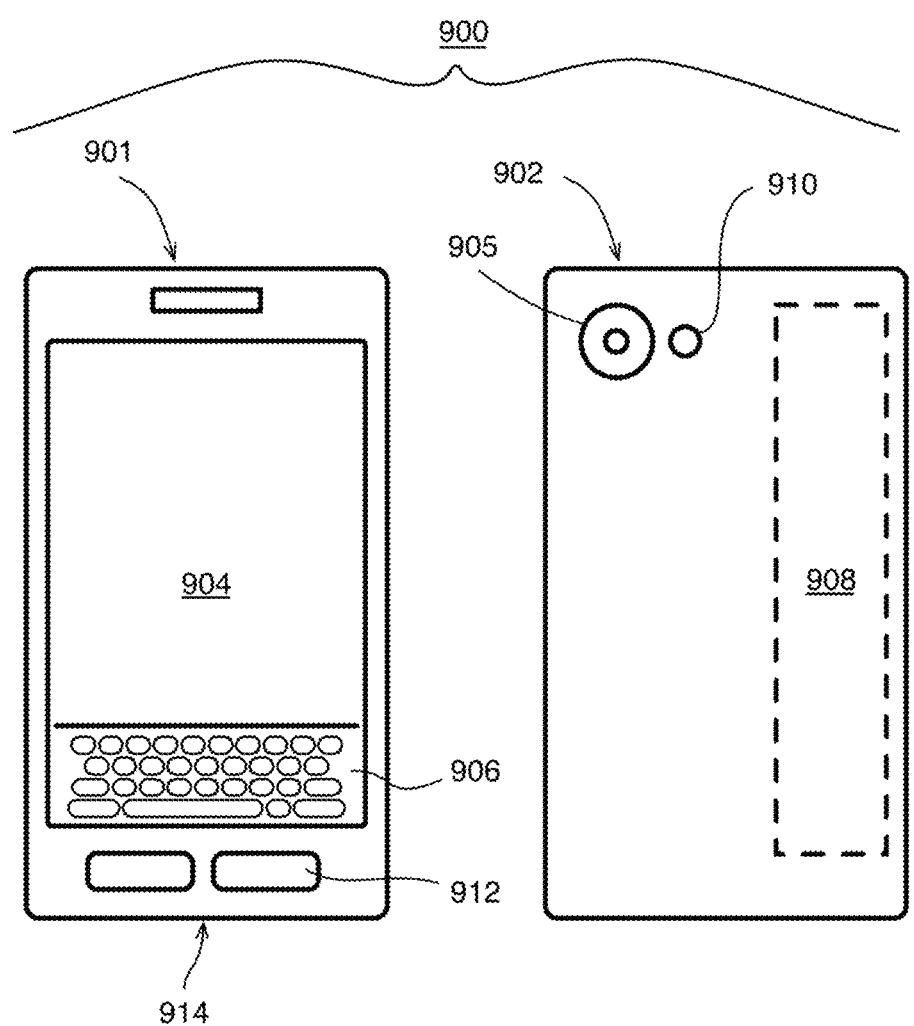

METHOD AND SYSTEM OF MULTIPLE FACIAL ATTRIBUTES RECOGNITION USING HIGHLY EFFICIENT NEURAL NETWORKS

CLAIM OF PRIORITY

This Application is a National Stage Entry of, and claims priority to, PCT Application No. PCT/CN2020/117788, filed on 25 Sep. 2020 and titled "METHOD AND SYSTEM OF MULTIPLE FACIAL ATTRIBUTES RECOGNITION USING HIGHLY EFFICIENT NEURAL NETWORKS", which is incorporated by reference in its entirety for all purposes.

BACKGROUND

Efficient recognition of multiple kinds of facial attributes in images or video is important for real-time applications such as biometric verification, affective interaction, and so forth. Unlike image classification problems for which several deep convolutional neural networks (CNNs) have been proposed (such as ResNet, DenseNet, ResNeXt, and others), multiple face attributes recognition (MFAR) is more complicated since it is much more dense and/or fine-grained with multi-task problems. Specifically, MFAR aims to recognize small details and subtle attributes such as emotion, age, gender, hair style, brow style, eye style, and so forth, shown in images or video in real time. In order to achieve high accuracy for MFAR, many existing CNN architectures are very deep and complex, substantially increasing computation costs, hardware footprint, and resource consumption, which prohibits practical deployment in real-time environments.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a flow chart of a method of multiple attribute facial recognition according to at least one of the implementations herein;

FIG. 3 is a schematic diagram of layers of a neural network for multiple attribute facial recognition showing a fractional attention technique according to at least one of the implementations herein;

FIG. 9 illustrates another example device, all arranged in accordance with at least some implementations of the present disclosure.

DETAILED DESCRIPTION

Figure 2A:
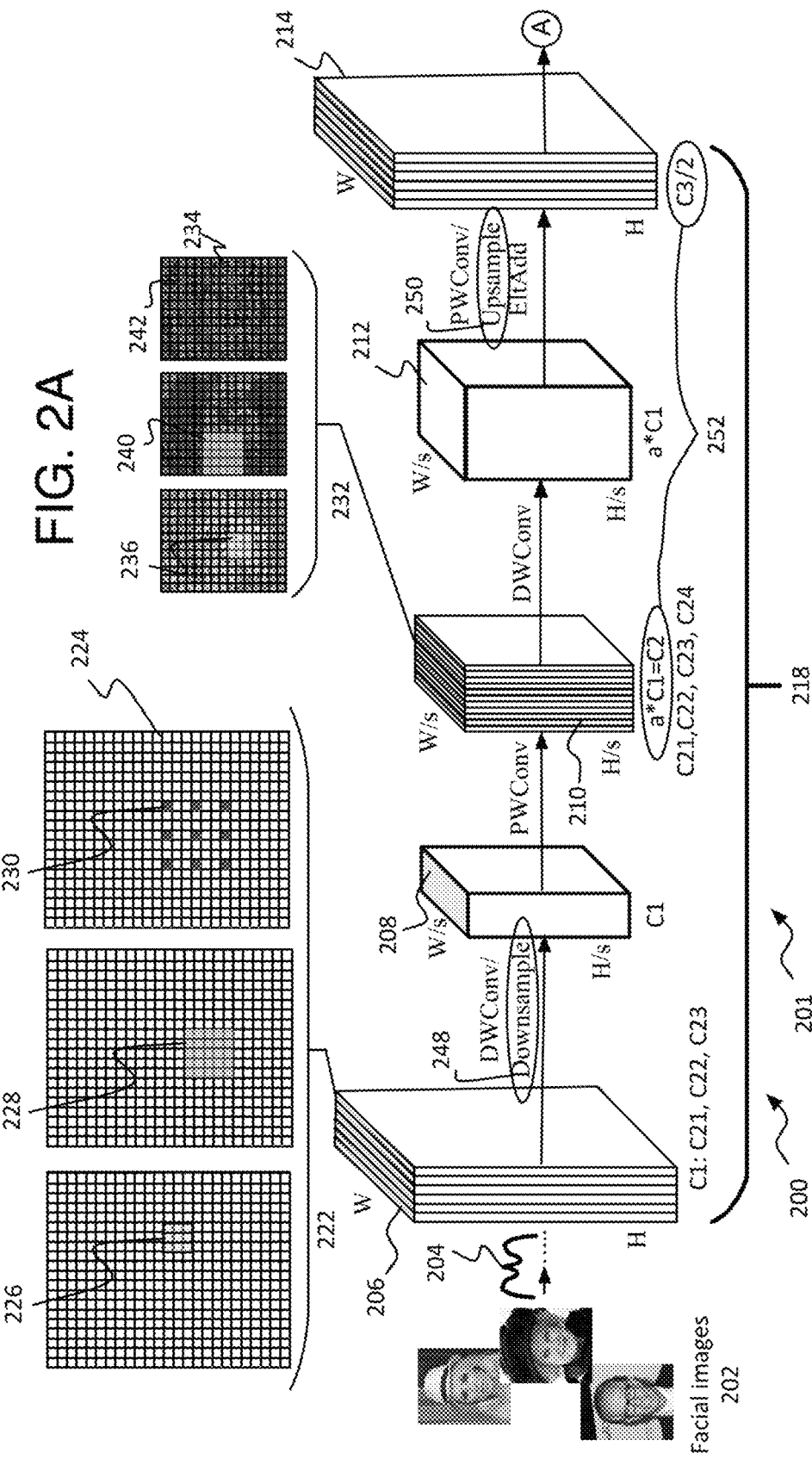
FIGS. 2A-2B is a schematic diagram of a bottleneck block of a neural network used for a method of multiple attribute facial recognition according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices, professional electronic devices such as one or more commercial television cameras, video cameras, and/or consumer electronic (CE) devices such as imaging devices, digital cameras, smart phones, webcams, video cameras, security cameras, video game panels or consoles, televisions, set top boxes, and so forth, may implement the techniques and/or arrangements described herein, and whether a single camera or multi-camera system. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on at least one machine-readable or computer-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer or machine readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of multiple facial attribute recognition using highly efficient neural networks is provided herein.

Typically, conventional facial detection and recognition algorithms concentrate on a single task such as determining whether a human face exists or the identity of a specific person based on their face. While such algorithms use neural networks, they do not have the sophistication in architecture and training to handle detailed facial attribute recognition that recognizes very subtle changes from face to face or for the same face over time. Such attributes may include emotion, age, gender, hair style, brow style, eye style, and so forth. Thus, these general recognition algorithms cannot be directly used for multiple face attributes recognition (MFAR) that has multiple tasks (simultaneously recognizing multiple different facial attributes), owing to low accuracy and heavy computational load.

Other large neural networks have been used successfully for MFAR such as mixed objective optimization network (MOON), alignment free facial attribute classification (AFFACT), and squeeze and spatial excitation (SSE) Network. These networks, however, often require extremely large memories, computation costs, and energy costs rendering them inefficient and largely unusable for smaller systems.

To attempt to solve the efficiency issues, current high efficiency, high performance, families of lightweight CNNs could be used to lower the computational load and such as MobileNet V1, MobileNet V2, ShuffleNet, and HBONet, to name a few examples, that mostly focus on exploring the designs of depth-wise separable convolutions, point-wise convolutions, and channel configurations. These networks, however, lack the extensive feature exploration for MFAR tasks, and therefore often result in low accuracy.

For example, HBONet (0.8) only has about two million multiply-adds and may be used by pre-training on ImageNet and/or MS-COCO datasets. See D. Li, et al., "HBONet: Harmonious Bottleneck on Two Orthogonal Dimensions", ICCV (2019). HBONet is mainly constructed with a bottleneck structure called Harmonious Bottleneck on two Orthogonal dimensions (HBO).

However, HBONet is designed to solve general vision problems such as visual object detection and recognition and image classification, and cannot acquire high accuracy in highly detailed MFAR tasks. Specifically, although HBONet jointly encodes feature interdependencies across both spatial and channel dimensions, HBONet ignores flexible and rich feature representations in convolution space which is significant for MFAR tasks. Also, the HBONet still is a variety or class of lightweight CNN backbone with a large computational complexity of about 14 to 305 mega-floating point operations per second (MFLOPs) while being designed for conventional image classification and object detection. Enriching the feature representation refers to having an extractable, more diverse feature group of image content that varies by scale, orientation, pose, and/or other characterizations enabling higher accuracy.

To precisely recognize multiple attributes in an image of a face, the networks should deeply mine diverse features in CNNs. Some attempts to do this could be performed by using deformable kernels that can enrich features in a convolutional layer. Deformable kernels are kernels that change in coefficient pattern by predetermined, learned offsets in order to detect objects that change in the images, such as by scale, aspect ratio, rotation, and so forth. See J. F. Dai, et al., "Deformable Convolutional Networks", arXiv preprint arXiv:1703.06211 (2017); and H Gao, et al., "Deformable kernels: Adapting effective receptive fields for object deformation", arXiv preprint arXiv: 1910.02940 (2019). Deformable convolutions and kernels introduce additional floating-point, instead of integer offset, parameters, leading to a heavy cost in computations. In addition, the deformation alone does not perform or result in any channel and spatial transformations, and is therefore inefficient because this technique is only a convolutional pixel sampling strategy. The resulting output spatial size and number of output feature channels is the same as the input.

Also, traditional attention mechanisms may be used to enhance the relevant features. An attention mechanism is used to enhance salient features for oriented tasks, or in other words, to detect fine classifications of objects despite differences in pose, scale, and rotation and by concentrating on small patches of an object and analyzing cluster patterns. See T. J. Xiao, et al., "The Application of Two-level Attention Models in Deep Convolutional Neural Network for Fine-grained Image Classification", arXiv preprint, arXiv: 1411.6447 (2014); and J Hu, et al., Squeeze-and-Excitation Networks. arXiv preprint arXiv:1709.01507 (2017). Here too, however, the conventional attention neural networks have very large computation costs that make these networks impractical since they do not adequately reduce parameters (weights). Thus, all of the networks mentioned cannot balance accuracy and efficiency well for MFAR tasks.

To resolve the issues mentioned above and enhance both accuracy and efficiency for MFAR tasks, the disclosed method and system uses a neural network bottleneck architecture to enrich feature representations while maintaining or reducing computational costs versus the known networks. The disclosed bottleneck structure uses neural network blocks each with a flexible multi-kernel arrangement that also performs spatial and channel transformations with per-block spatial and/or channel fractional attention in a neural network that performs accurate and highly efficient MFAR tasks. Thus, the bottleneck neural network block disclosed herein uses flexible multi-kernel convolution in layers during harmonious (channel and spatial) transformations with relevant fractional attention so it can be referred to as an MHFNet. MHFNets are a variety of lightweight CNN architectures supporting real-time MFAR. An MHFNet enriches valuable features for multiple face attributes recognition and reduces computational load burdens at the same time.

In the bottleneck structure, flexible multi-kernel convolution layers each have channels that are partitioned (or grouped) into multiple groups, and flexible convolution kernels are applied to each of the groups of channels. The kernels can be different sizes or different dilation factors for different groups. The results of the multiple kernels are then summed or otherwise combined to provide outputs for a desired number of output channels. This arrangement captures multi-resolution patterns in a single convolution layer with very little additional computation cost, if any. The flexible multi-kernel convolution layers are nested in both spatial and channel transformation structure to further enhance the multi-kernels' interaction. The transformation structure has two reciprocal components, namely spatial contraction-expansion transformation and channel expansion-contraction transformation located in a bilaterally symmetric structure. This provides a harmonious arrangement that improves bottleneck representation for multiple face attributes while reducing computation cost via encoding the feature interdependencies across convolutional space, channel space, and spatial space.

Additionally, a fractional attention mechanism is provided for the bottleneck structure blocks and per-block rather than once for an entire network. Distinguishing from current attention mechanisms which mainly focus on complex designs, the disclosed attention mechanism uses simple, "smart", and efficient fractional attention cells. To enhance most relevant features for MFAR, spatial fractional attention and channel fractional attention correspond to spatial and channel transformations, respectively by pixel-wise and channel-wise feature calibrations in an interleaving manner. Finally, a variety of new lightweight CNN architectures may be used with the disclosed bottleneck and that improves MFAR performance in images with extremely low budgets.

The structure mentioned above with the use of block-based flexible multi-kernel convolution with spatial and channel fractional attention has more accurate representation and better generalization with increased performance while using a smaller computational load to adequately perform on devices with limited processing resources and limited power.

As validated on a CelebA dataset, the largest face attributes image dataset, the disclosed method, system, and network is better than the conventional state-of-the-art solutions as can be clearly seen from the results shown in Table 2 discussed below. For instance, the disclosed network outperforms MOON and AFFACT networks with fewer parameters of 0.3% and 1.4%, respectively. The highest recognition rate of the disclosed network is 92.63%, higher than state-of-the-art methods.

By one form, the disclosed MHFNet has a computational complexity of less than 6 MFLOPs, specially tailored to high-performance recognition of human face attributes (e.g., emotions like happy, sad and surprise, face shape types like slim and wide, gender like male and female, hair types like long and short, race like black and white, and so forth) with image and/or video inputs collected by cameras. As a result, MHFNet models may be well suited to a variety of computational environments including on resource-constrained devices. Also, the MHFNets have a broad range of emerging image and/or video driven applications (e.g., computer vision, smart video conferences, intelligent human-computer interaction (HCI) devices or programs, gaming, visual searching engines, and so forth) on mobile, embedded, or autonomous devices, for example.

By one example form, the basic block structure of HBONet may be used to provide spatial and channel transformations, while adding, per-layer, mixed kernels for capturing multi-scale facial features and spatial and channel fractional attention for discriminating different facial regions and context cues thereby generating a neutral network block with great performance both in accuracy and efficiency compared to state of the art solutions. Specifically, the presently disclosed method and system of neural networks herein use about 80 times fewer parameters (such as weights) and 20 times less multiply-add operations.

Referring to FIG. 1, an example process 100 is a computer-implemented method of image processing of multiple facial attributes recognition using highly efficient neural networks. In the illustrated implementation, process 100 may include one or more operations, functions or actions as illustrated by one or more of operations 102 to 108 numbered evenly. By way of non-limiting example, process 100 may be described herein with reference to example image processing networks or blocks 200, 300, 400, 500, or 600, and systems 700 or 800 (FIGS. 3-8 respectively), and where relevant.

Process 100 may include "obtain at least one image with at least one facial region" 102. This may involve obtaining pre-determined facial regions of images such as by known face detection techniques or images that are known to have faces.

Process 100 may include "recognize multiple facial attributes on the at least one facial region using a neural network with at least two blocks each having at least one network layer" 104. For deep convolutional neural networks (CNNs), a block is a basic structural unit with one or more main operation layers such as a convolutional layer (with filters (or kernels) and weights for example) and often, but not always, with accompanying refinement layers such as batch normalization, ReLU, feature connections, concatenation, and/or addition operations with data from a previous layer, stage, or block, or data of the same block but of a different channel, and so forth. For example, a single block may have inputs $x(l)$ that are the feature maps generated from a previous block, and the current block outputs $x(l+1)$ feature maps which are to be inputs to a subsequent block. So, for a CNN with a specific network depth (such as ResNet-18/-50/-110 for example), the network is built by stacking a fixed number of blocks, and some other separate basic layers such as down sampling layers are added after several specific blocks, fully connected layers, and SoftMax for image classification as one example. So here, a block therefore is defined as being less than an entire network and usually more than a single layer, although it could be a single layer. A block often has a distinct dimension or characterization, such as a constant channel size, or distinct purpose, such as being a bottleneck structure here. An example of a single block is a bottleneck structure of FIGS. 2A-2B, FIG. 4, and alternatively FIG. 5. By one example, a network may have only one of the bottleneck blocks described herein, and any other extra layers, such as a final GAP block and fully connected layer, would be considered a second block.

Process 100 may include "wherein one or more of the individual blocks have at least one individual layer with multiple kernels with varying sizes" 106. This involves grouping channels where each or individual group has a different kernel than that of the other groups, or at least one other group. By one form, each group has the same number of channels but need not always be. By one form, at least one of the kernels is a dilated kernel to fit a larger area. By one example, this may be a 3×3 kernel that is dilated to cover a 7×7 area with a dilation rate of 3 which provides a 7×7 kernel but with much lower cost (9 vs. 49 multiplication operations). The resulting feature map generated from each group is combined by concatenation along channel dimension.

Process 100 may include "wherein one or more individual blocks perform at least one per-block fractional attention operation". 108 This may include spatial or channel fraction attention or both. This may involve using a side pathway to generate weights to apply to features from a main pipeline of the block. Channel fractional attention or spatial fractional attention or both may be applied to the same block or different blocks.

It will be appreciated that process 100 explained with FIG. 1 does not necessarily have to be performed in the order shown, nor with all of the operations shown. It will be understood that some operations may be skipped or performed in different orders.

Figure 2B:
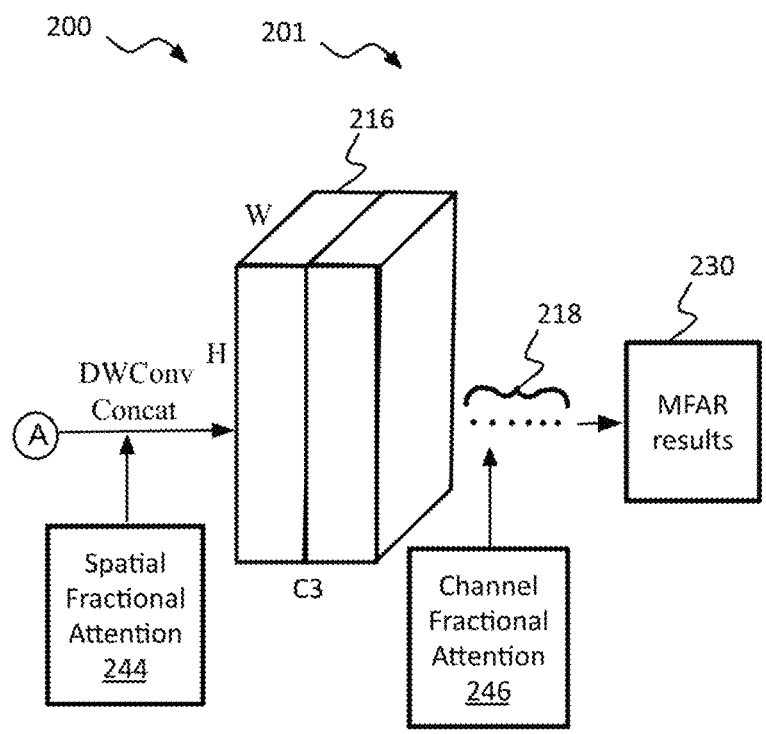

Referring to FIGS. 2A-2B, a neural network bottleneck structure or block (or multiple-kernel bottleneck (MKB)) 200 is part of a MHFNet or other neural network 201 that is a multiple face attributes recognition (MFAR) neural network. The bottleneck block 200 is formed of layers 206 to 216, and optionally including attention operations 244 and 246.

The details of the bottleneck structure 200 are provided below and include four aspects that significantly improve performance without sacrificing accuracy (and even improving it): (1) the bottleneck providing a lightweight CNN by using the flexible multi-kernel convolution; (2) individual bottleneck blocks having two reciprocal components, namely spatial contraction-expansion transformation and channel expansion-contraction transformation provided within a bilaterally symmetric structure with the multi-kernel convolutions; (3) a fractional attention mechanism; (4) a lightweight MHFNet CNN architecture that increases MFAR performance with extremely low computational budgets, and any single one or any combination of these.

The input 202 are facial regions or facial images. Preprocessing and a facial detection and recognition operation may have been performed to determine which images have faces and should be used for attributes detection to form the facial image input 202. Thereafter, the MHFNet 201 may have many different layer configurations before providing the propagated image data in the form of features, feature vectors, or feature maps to the bottleneck structure. This initial structure 204 may include one or more conventional convolutional layers or blocks for example. Then, to start the bottleneck structure 200, a downsampling depthwise convolutional layer 206 is provided before a pointwise convolutional layer 208. It will be understood that the pointwise layers form the desired bottleneck effect. Next, a depthwise convolutional layer 210 is provided before another pointwise convolutional upsampling (EtAdd) layer 212. A depthwise convolutional concatenation layer 214 may be next, and the end of the MKB bottleneck structure 200 may include a layer 216 of channel concatenation, stacking input and output feature channels of the MKB bottleneck together along the channel dimension. Thereafter, the MHFNet 201 may include inverted residual (IR) layers, usual convolutional layers, pooling layers, and so forth in subsequent network structure 218. The details of an example entire network architecture 201 is provided below with FIG. 6 and Table 1.

The final outputs 230 are the recognized attribute categories where each node in an output layer of the MHFNet 201 may provide a probability value for a specific attribute, and in one form, where the node may be fixed to always provide a value for a specific attribute. The output values may form a vector that provides one value for each attribute such as those mentioned herein, whether emotion, hairstyles, facial hairstyles, skin color, age, gender, and so forth.

As to the MKB structure 200, layers 206 and 210 use multiple kernels for multi-kernel convolution and as explained below, while the downsampling 248 and upsampling 250 mentioned as well as the channel variations 250 provide the transformation 218 extending from layer 206 to layer 214. Also, spatial and channel fractional attention 244 and 246 are provided (or more specifically, applied) after layers 214 and 216, respectively, for example.

The flexible multi-kernel convolution is used because it reduces the computational cost of the convolution. This is revealed when depthwise separable convolution is understood. Particularly, lightweight CNNs tend to have no fully connected layer, and convolutional layers occupy most of the computational cost and parameters of the whole model (or network). Depthwise separable convolution serves as a computational effective equivalent of standard convolution.

A traditional depthwise separable convolutional layer decomposes a conventional convolution operation into two stages. First, a bottleneck depthwise convolutional layer performs a convolution with a k×k kernel on each channel of an input feature tensor, and follows with a 1×1 pointwise convolution that concatenates c1 channels (where c1 is a count of the number of channels of a particular size) and projects the concatenated c1 channels to a new space with a desired channel size with a count of c2 channels, introducing interactions among different channels as well. By performing convolutions in this way, a depthwise separable convolutional layer only has the computational cost of:

$$E = (h \times w \times c_1 \times k \times k) + (h \times w \times c_1 \times c_2) \quad (1)$$

which is approximately $1/k^2$ the cost compared to that of the corresponding standard convolutional layer:

$$h \times w \times c_1 \times c_2 \times k \times k. \quad (2)$$

Thus, cost equation (2)>(1) since the value of the first term in (1) is much smaller than that of the second term as k×k is much lower than c2 in real CNN structure, e.g., 3×3 vs. 512/1024.

For one flexible multi-kernel depthwise separable convolution layer, suppose c1 channels are separated into n groups, each of which has c1$i$ channels with a $k_i \times k_i$ kernel:

$$\Sigma_{i=1}^{n} c_{1i} = C_1 \quad (3)$$

If the desired channel size of the output is c2, then the computational cost is:

$$E' = h \times w \times (\Sigma_{i=1}^{n} c_{1i} \times c_{fi} \times k_i \times k_i) + (h \times w \times c_f \times c_2) \quad (4)$$

Considering the effectiveness of an implementation in feature maps, n may be less than 10 and 3≤$k_i$≤11 in an actual network. When $k_i$ is large, a small kernel with a dilated factor can be used to approximate the $k_i$ size. Therefore, E=E'. This effectively expands the feature description capability of each convolutional layer without increasing the complexity of the parameters.

Still referring to FIGS. 2A-2B to show some examples, flexible multi-kernel depthwise separable convolution can take advantage of this reduction in computational load. Compared to a single same size k×k kernel for all channels for a single layer, a flexible kernel mode is used here for each channel. In particular, channels are partitioned into multiple groups and flexible convolution kernels are applied to each of them. For example, convolutional layer 206 has six channels that are collectively referred to as c1 and grouped into three groups c11, c12 and c13 with two channels in each group (c11+c12+c13=c1). Each depthwise convolution enriches its feature expression by this operation since it uses a diverse set of kernels, a different one for each group. Three feature maps 224 show three different kernel examples for layer 206, and two of them are with 'detail' kernel forms (attempting to identify greater detail in image data). This includes a 3×3 kernel 226, a 5×5 kernel 228, and a dilated 3×3 kernel 230 covering a 7×7 area. The dilated kernel can extend the range of feature extraction with fewer parameters. Convolutional layer 206 also has a channel size of H×W.

The resulting feature maps after applying the multiple kernels will each have a different receptive field corresponding to a different kernel that is used. These feature maps are combined for the next layer by concatenating the results to form desired channel dimensions for the next layer, which in this case will be a pointwise layer.

Another convolutional multi-kernel layer 210 with a size of N/s×W/s×C2 has a different size and number of channels due to spatial contraction and channel expansion transformation as explained below but otherwise performs the same multi-kernel operations as described with layer 206. Thus, here C2 channels, such as 12 channels, may be divided into four groups with three channels each as shown by four feature maps 234. The kernels, with one for each group, include a 3×3 kernel 236, a 5×5 kernel 240, and a dilated 3×3 kernel with a dilation rate of 3 (242) to cover a 7×7 area.

As another aspect of the bottleneck block 200, spatial and channel transformations 218 may be nested with multi-kernel convolutions. Although flexible multi-kernel convolution has extended feature expression in one convolutional layer, the multi-scaled features concatenated at the end of the convolutional layer for each group of channels (C11, C12, C13) has no interactions among the different groups. Interacting the features from different groups can facilitate the flow of multi-scaled information which is significant for MFAR. This can be accomplished by nesting spatial and channel transformations 218 with flexible multi-kernel convolutions in two reciprocal components: a spatial contraction-expansion transformation 248-250 (shown by the downsample and upsample of channel size operations) and channel expansion-contraction transformation 252 shown by the channel expansion factor a and channel division operation), in a bilaterally symmetric structure block 200.

In operation, the downsampling 248 is performed by applying a scale or stride s to form channels C1 on layer 208 with a smaller size of H/s×W/s than H×W on layer 206. Layer 208 then may perform point wise convolution. Any specific desired channel sizes may be used. Otherwise, a separate downsampling layer could be placed between convolution layers 206 and 208.

The pointwise convolution of layer 208 applies an expansion factor a and results in expansion of the number of channels from C1 to C2 on depthwise convolutional layer 210. In this example, the channel expansion 250 resulted in 12 channels divided into four groups (C21, C22, C23, C24) but any desired number of channels may be used.

The next layer 212 is a pointwise convolutional layer still with the same input channel size and number of channels as depthwise convolutional layer 210. The layer 212, however, results in an upsampling element-wise add operations (EltAdd) 250 and a division (C3/2) of the number of channels (252) so that a next depthwise convolutional channel 214 is back to the same or similar dimensions (H×W×C3) as layer 206 thereby completing the reciprocal transformation. (Note C3 is not necessarily the same as C1. The number of channels, albeit reduced from C2, can still be different). For example, C3 may be 2 channels, instead of 6, as shown on convolutional layer 216 with dimensions (H×W×C3). Layer 216 may be considered the last layer in bottleneck block 200 before other MHFNet 201 operations 218 as mentioned above.

The transformations work in a harmonious manner with the flexible multi-kernel convolutions to establish an even lower computational cost for the bottleneck block 200. Specifically, the spatial contraction operation 248 is responsible to reduce input feature maps to a smaller size temporarily, thereby providing a substantial increase in computational efficiency. The subsequent channel expansion-contraction component 252 compensates for a resulting side effect such as information loss by spatial contraction (i.e., resolution downsampling)) by emphasizing informative features providing more groups for greater variety of kernels for multi-kernel operation. Finally, a spatial expansion operation 250 is performed to make output features with the same size as the output of a shortcut connection. In the spatial contraction-expansion component 248-250, the spatial contraction operation 248 exploits the multi-kernel depthwise convolution with stride s to downsample the spatial size of the input feature tensor from h×w×c1 into h/s×w/s×c1, while the spatial expansion operation 250 aims to upsample output features to generate the identical spatial size with that of the input feature tensor (or its pooled version). The overall computational cost becomes:

$$\frac{B}{s^2} + \frac{h}{s} \times \frac{w}{s} \times \left(\sum_{i=1}^{n} c_{1i} \times k_i \times k_i\right) + h \times w \times \left(\sum_{j=1}^{m} c_{2j} \times k_j \times k_j\right) \quad (5)$$

where B denotes the original computational cost of the layers inserted between the spatial contraction and expansion operations with scale or stride s=1. Spatial contraction-expansion 248-250 and channel expansion-contraction 252 transformations with flexible multi-kernel convolution also demonstrate substantial flexibility and scalability because number and size of kernels, as well as multi-kernel convolutional layers, can be selected as desired.

Referring now to FIG. 3, a network 300 has an attention mechanism 301 (244 and 246 on FIG. 2B) that provides calibration weights to enhance desirable features and improve network performance. Usually, known attention techniques which mainly focus on complex designs, lead to heavy computational loads and a large number of parameters needed for determining and applying calibration weights. Here, however, per-block fractional (rather than entire) attention is used and that factors both attention ability and computational efficiency. While corresponding to the spatial and channel transformations mentioned above, the fractional attention has spatial fractional attention and channel fractional attention respectively, to emphasize the most relevant features for MFAR. The spatial fractional attention and channel fractional attention correspond to spatial and channel transformations respectively, by pixel-wise and channel-wise feature calibrations in an interleaving manner.

Specifically, network 300 has an input feature 302 such as feature vectors or maps from earlier network layers that already analyzed one or more face images. The input feature 302 may have dimensions H×W×C. The feature may be provided to a global average pooling (GAP) operation 304 to pool the values to reduce the feature size, two (or more) convolution operations 306 and 308 which are used to calculate gating weights, and a weights unit 310 that transforms its input into the output having the size of 1×C for calibrating the input feature. The output is then multiplied (by multiplier 312) with the values from the input feature 302 in a channel-wise manner (that is, each channel has one shared calibration factor). Generally, the larger a specific weighted feature value, the greater the influence going forward in the neural network 201 (although other weighting affects could be used such as the inverse weights, etc.). This may be performed "fractionally" by using the input to each multi-kernel bottleneck block to apply to the output of the block.

The layers or operations 304, 306, 308, and 310 to compute the weights of the SFA and/or CFA is a separate flow (or side pathway or pipeline) from the main pipeline or pathway with layers 206 to 216 of bottleneck block 200 (FIGS. 2A-2B).

Also different from previous methods, the kernel size K in these convolutional operations is in substantial or direct proportion (∝) to the size of features derived from the GAP operation. For instance, channel fractional attention (CFA) has a feature size of 1×1×C after the 304 GAP and at the weight unit 310. Then the kernel size in the following convolutions are:

$$K = \left\lfloor \log \frac{C}{\sigma} \right\rfloor \quad (6)$$

shown as K∝C above convolutional layers 306 and 308, and where σ and ρ (below) are parameters to control the proportional rate.

For spatial fractional attention (SFA), the feature size is H×W×1 after the GAP 304 and at the weights unit 310. The kernel size at the convolutional layers 306 and 308 is:

$$K_h = \left\lfloor \log \frac{H}{\rho} \right\rfloor, K_w = \left\lfloor \log \frac{W}{\rho} \right\rfloor \quad (7)$$

If σ and ρ are large, the parameter cost will be lower. Also optionally, supervised loss with ground truth labels can be used to accelerate a training process.

Figure 4:
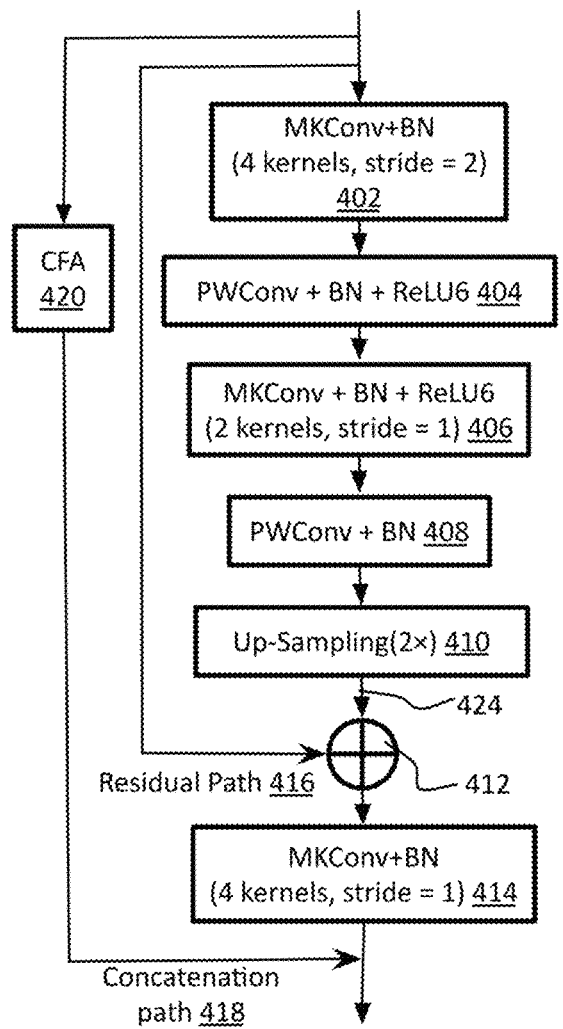
FIG. 4 is a schematic diagram of a bottleneck block of a neural network for multiple attribute facial recognition according to at least one of the implementations herein.

Referring now to FIG. 4, another example bottleneck block 400 has depthwise multi-convolutional layers (MKConv) 402, 406, and 414, each with an accompanying batch normalization (BN) layer or operation. Pointwise convolutional (PWConv) layers 404 and 408, also with BN, are provided after each MKConv layer 402 and 404. A separate upsampling (2×) layer 410 is provided after the second MKConv layer 406. The PWConv layer 404 and MKConv layer 406 also have a ReLU6 layer or operation.

An adder or combiner 412 is provided after the upsampling to factor in a residual path 416. CFA 420 as described on network 300 also receives block input and provides a concatenation path 418 to add data to the features from the main pipeline 424.

Figure 5:
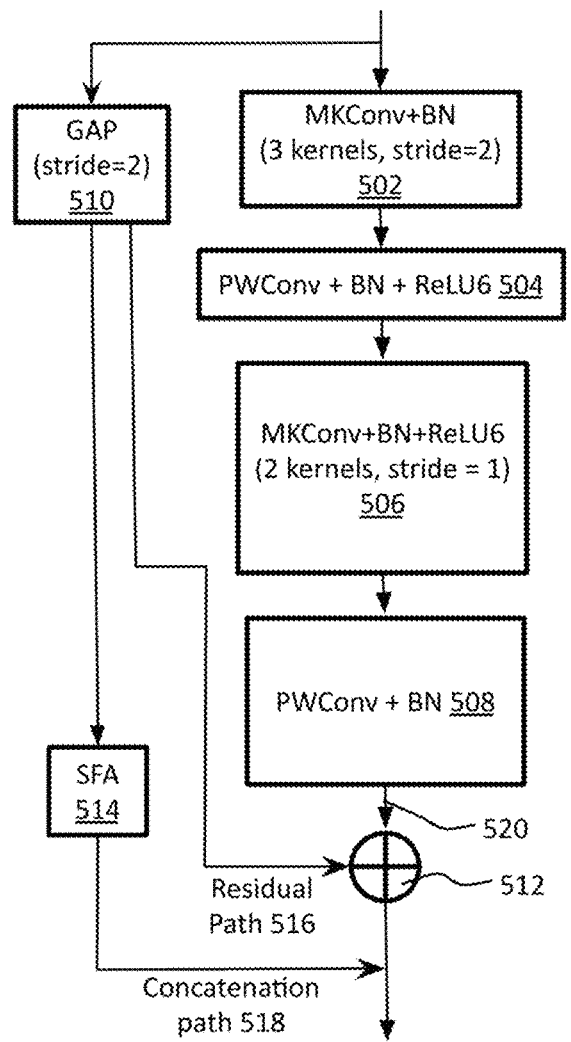
FIG. 5 is another schematic diagram of a bottleneck block of a neural network for multiple attribute facial recognition according to at least one of the implementations herein.

With this structure, the block 400 may include any combination, but here all four aspects of: (a) each flexible multi-kernel depthwise separable convolution layer (MKConv) 402, 404, or 406 has a number of kernels that equals the number of groups with the same number of channels. (b) In each channel expansion-contraction component, the low dimensional representation is expanded in a channel dimension and filtered with MKConv, and subsequently contracted back to the space of low dimension with a linear convolutional filter. On block 400 then, expansion is performed by layer 404, and contraction by layer 408. (c) Based on channel expansion-contraction component, transformations can be executed in the spatial dimension, where MKConv layer 402 has a stride 2 to reduce the channel sizes in half and an optional subsequent bilinear up-sampling operation or layer 410. This spatial contraction-expansion corresponds to the opposite channel expansion-contraction components. (d) Some channels of an output feature map may be drawn from the input tensor, or its pooled version, through the channel fractional attention 420 for network 400 (and SFA for network 500 (FIG. 5). The SFA and CFA perform a concatenation operation to add data to the data (or features) of the main pipeline to both decrease the number of output channels to be computed in the main branch or pipeline and to encourage relevant feature reuse in the information flow as an efficient and effective component.

Referring to FIG. 5, a different example bottleneck block 500 is shown but with similar operation as block 400 except here with SFA rather than CFA. Thus, block 500 includes MKConv layers 502 and 506, and PWConv layers 504 and 508 that are similar to layers 402, 404, 406, and 408 of block 400 except here the number of multi-kernels is 3 at layer 502 and 2 at layer 506. Also for block 500, a GAP layer 510 with stride (or scaling) 2 is provided, as described above with GAP 304 (FIG. 3) and both the residual path 516 and the SFA with the concatenation path 518 run through the GAP layer 510 first. An adder or combiner 512 combines the residuals with the features from the main pipeline 520.

Figure 6:
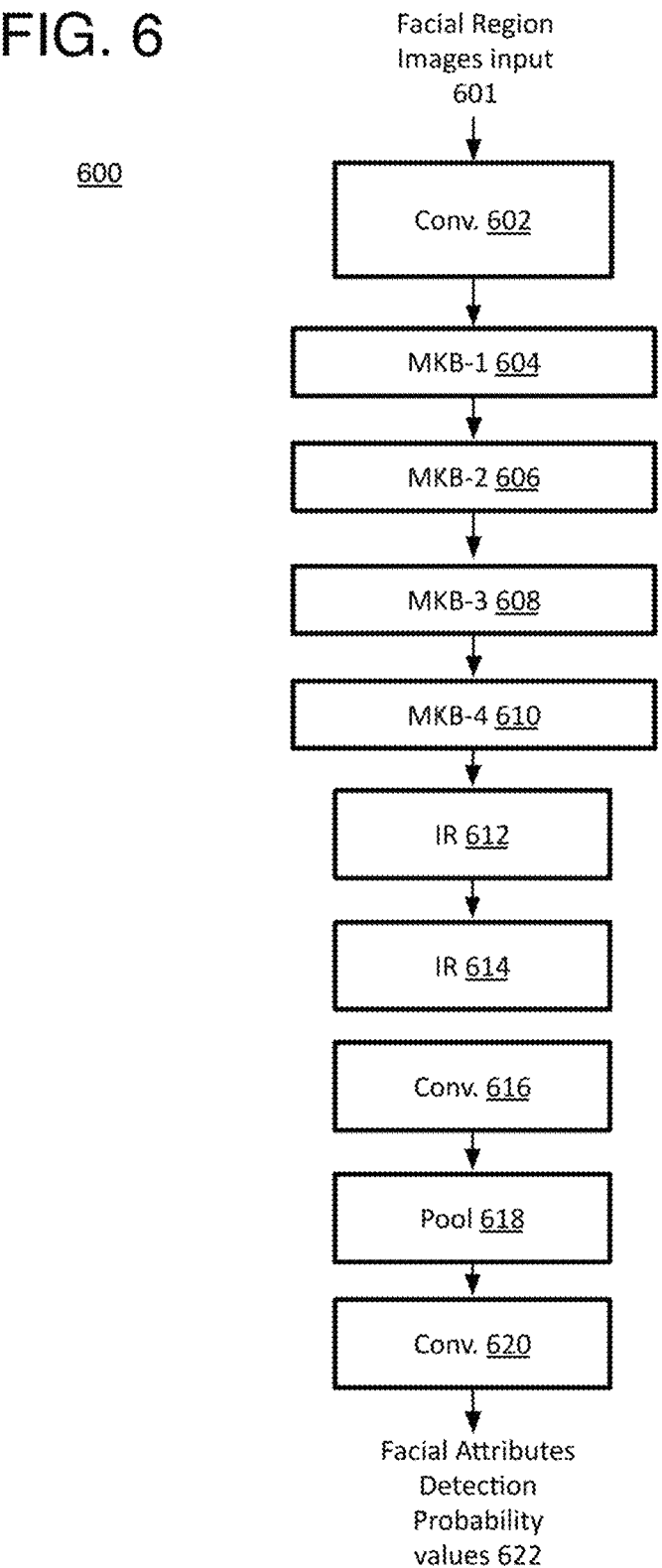
FIG. 6 is a schematic diagram of a neural network architecture for multiple attribute facial recognition according to at least one of the implementations herein.

Referring to FIG. 6, MHFNets, such as network 600 described below, may stack a set of the MKB blocks 200, 400, or 500 and other basic layers. It will be appreciated that a variety of different models at different computational complexities can use the MKB structure. The architecture of an MHFNet or neural network 600 is shown and described in Table 1 below. MKB denotes the bottleneck block (such as example blocks 200, 400, or 500 described above) and IR denotes an inverted residual with a linear bottleneck. See N Ma, et al., "Shufflenet v2: Practical guidelines for efficient cnn architecture design", ECCV (2018). It will be noted that network 600 has four consecutive MKBs 604-610 (MKB repeated four times but could be at least four times or could be less) numbered evenly in order to extract rich hierarchical convolutional features at progressively reduced feature resolutions from 112×112 to 14×14. The width of each layer is adjusted to approach a better balance between the model (neural network) capacity and computational complexity. A pointwise convolution also exists without a subsequent nonlinear activation operation inserted between the two block groups of different types. This projects intermediate features into a low-dimensional representation space.

TABLE 1

Example Architecture of MHFNet (also shown in FIG. 6).

| BLOCK | Input size | Operator | a | C | n | s |
|---|---|---|---|---|---|---|
| 602 | $224^2 \times 3$ | Conv2d 3 × 3 | — | 36 | 1 | 2 |
| 604 | $112^2 \times 36$ | MKB-1 | 2 | 72 | 1 | 1 |
| 606 | $56^2 \times 72$ | MKB-2 | 4 | 96 | 2 | 2 |
| 608 | $28^2 \times 96$ | MKB-3 | 4 | 132 | 3 | 2 |
| 610 | $14^2 \times 132$ | MKB-4 | 4 | 188 | 3 | 2 |
| 612 | $14^2 \times 188$ | Conv2d 1 × 1 | — | 94 | 1 | 1 |
| 614 | $14^2 \times 94$ | IR | 4 | 120 | 2 | 2 |
| 616 | $7^2 \times 120$ | IR | 4 | 320 | 1 | 1 |
| 618 | $7^2 \times 320$ | Conv2d 1 × 1 | — | 1200 | 1 | 1 |
| 620 | $7^2 \times 1200$ | Avgpool 1 × 1 | — | — | 1 | — |
| 622 | $1^2 \times 1200$ | Conv2d 1 × 1 | — | 40 | — | — |

Each line describes a sequence of one or more identical (modulo stride) layers, repeated 'n' times. All layers in the same sequence have the same number 'C' of output channels. The first layer of each sequence has a stride 's' and all others use stride 1. An expansion factor 'a' increases the number of input channels to a times compared with that of the last neighboring block/layer, which is always applied to the input size as described in FIGS. 2A-2B and expands the W×H channel number.

As to the training of the neural network, the network is trained as a single network with all portions of the network as mentioned above including the bottleneck block and each of the techniques used therein such as the multi-kernel convolutional layers, transformations, and attention aspects. The training is performed by using common techniques where (1) the training uses a given dataset with facial image regions, annotated attributes, and the neural network structure described above. (2) The training sets initial parameters, training hyper-parameters, such as the batch size, the number of iterations, learning rate schedule, and so forth. (3) The training then updates parameters by optimizing a multi-task loss function until convergence or to a last iteration, and (4) final parameters are saved as the final model.

For experiments, a mainstream dataset CelebA was used, and the network was implemented in Pytorch. See Z. Liu, et al., "Deep learning face attributes in the wild", ICCV (2015). CelebA contains over 200 k images from approximate 10 k celebrities. Following the standard evaluation protocol, the first 160 k images are used for training, 20 k images for validation and the remaining 20 k for test. Each image is annotated with binary labels of 40 face attributes.

The MOON and AFFACAT approaches were selected for comparison. See E. M Rudd, et al., "Moon: A mixed objective optimization network for the recognition of facial attributes", ECCV (2016); and M Günther et al., "AFFACT—alignment free facial attribute classification technique", arXiv preprint arXiv: 1611.06158 (2016). The results are shown in Table 2 below. The disclosed bottleneck network in the MHFNet led in scalability and performance slightly beating the known networks in accuracy while providing great reductions in parameters used and required memory.

TABLE 2

Accuracy, memory and parameter count comparison with state-of-the-art methods.

| Methods | Accuracy (%) | Parameters | Memory |
| --- | --- | --- | --- |
| MOON | 90.84 | 136M | 457 MB |
| AFFACT | 91.67 | 26M | 98.2 MB |
| Disclosed MHFNet | 92.63 | 0.36M | 5.2 MB |

Memory usage reported here is on-disk space used by the neural network model.

Also, any one or more of the operations of FIG. 1 as well as the networks of FIGS. 2A-6 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 7:
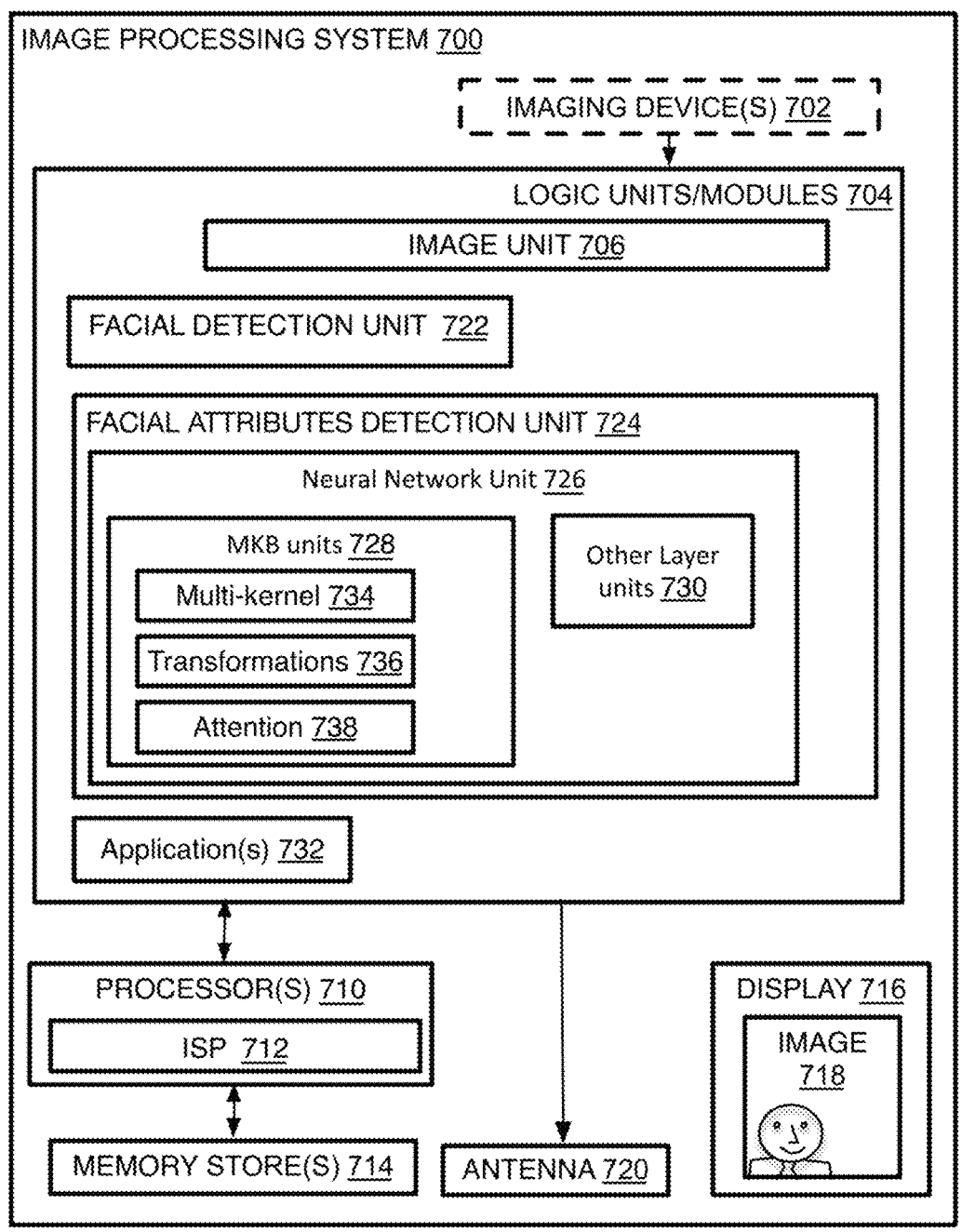
FIG. 7 is an illustrative diagram of an example system.

Referring to FIG. 7, an example image processing system 700 is arranged in accordance with at least some implementations of the present disclosure. In various implementations, the example image processing system 700 may have one or more imaging devices 702 to form or receive captured image data, and this may include either one or more cameras such as an array of cameras. Thus, in one form, the image processing system 700 may be a digital camera or other image capture device. In this case, the imaging device(s) 702 may be the camera hardware and camera sensor software, module, or component. In other examples, imaging processing system 700 may have an imaging device 702 that includes, or may be, one camera or some or all of the cameras in the array, and logic modules 704 may communicate remotely with, or otherwise may be communicatively coupled to, the imaging device 702 for further processing of the image data.

Accordingly, the part of the image processing system 700 that holds the logic units 704 and that processes the images may be on one of the cameras or may be on a separate device included in, or entirely forming, the image processing system 700. Thus, the image processing system 700 may be a desktop or laptop computer, remote server, or mobile computing device such as a smartphone, tablet, or other device. It also could be or have a fixed function device such as a set top box (cable box or satellite box), game box, or a television. The camera(s) 702 may be wirelessly communicating, or wired to communicate, image data to the logic units 704.

In any of these cases, such technology may include a camera such as a digital camera system, a dedicated camera device, web cam, or any other device with a camera, a still camera and so forth for the run-time of the system as well as for model learning and/or image collection for generating image data datasets for training. The cameras may be RGB cameras or RGB-D cameras, but could be YUV cameras. Thus, in one form, imaging device 702 may include camera hardware and optics including one or more sensors as well as auto-focus, zoom, aperture, ND-filter, auto-exposure, flash, actuator controls, and so forth. By one form, the cameras may be fixed in certain degrees of freedom, or may be free to move in certain or all directions.

The logic modules 704 of the image processing system 700 may include, or communicate with, an image unit 706 that performs at least partial processing. Thus, the image unit 706 may perform pre-processing, decoding, encoding, and/or even post-processing to prepare the image data for transmission, storage, and/or display. It will be appreciated that the pre-processing performed by the image unit 706 could be modules located on one or each of the cameras, a separate image processing unit 700, or other location.

In the illustrated example, the logic modules 804 also may include at least a facial detection unit 722, a facial attributes detection unit 724, and applications 732 that use the output attribute detection data from the facial attributes detection unit 724. The facial attributes detection unit 724 may include or use an MKB units 728 and other layer units 730. The MKB units 728 may have a multi-kernel unit 734, a transformations unit 736, and attention unit 738 to perform tasks related to the operations suggested by their unit label, and whether in software, hardware, or firm ware. These units may be operated by, or even entirely or partially located at, processor(s) 710, such as the Intel Atom, and which may include a dedicated image signal processor (ISP) 712, to perform many of the operations mentioned herein including neural network operations by multiply-accumulate circuits for example. The logic modules 704 may be communicatively coupled to the components of the imaging device 702 in order to receive raw image data. The image processing system 700 also may have one or more memory stores 714 which may or may not hold the neural network data being used such as the input image data being analyzed, intermediate output values, parameters, biases, and so forth, as well as other image data or logic units or modules mentioned above. An antenna 720 is provided for wireless transmissions of any of the data mentioned. In one example implementation, the image processing system 700 may have at least one processor 710 communicatively coupled to a display 716, and at least one memory 714 communicatively coupled to the processor to perform the operations described herein as explained above.

The image unit 706, which may have an encoder and decoder, and antenna 720 may be provided to compress and decompress the image date for transmission to and from other devices that may display or store the images. This may refer to transmission of image data among cameras, and the logic units or modules 704. Otherwise, the processed image and/or output results 718 may be displayed on the display 716 or stored in memory 714 for further processing as described above. As illustrated, any of these components may be capable of communication with one another and/or communication with portions of logic modules 704 and/or imaging device 702. Thus, processors 710 may be communicatively coupled to both the image devices 702 and the logic modules 704 for operating those components. By one approach, although image processing system 700, as shown in FIG. 7, may include one particular set of unit or actions associated with particular components or modules, these units or actions may be associated with different components or modules than the particular component or module illustrated here.

Figure 8:
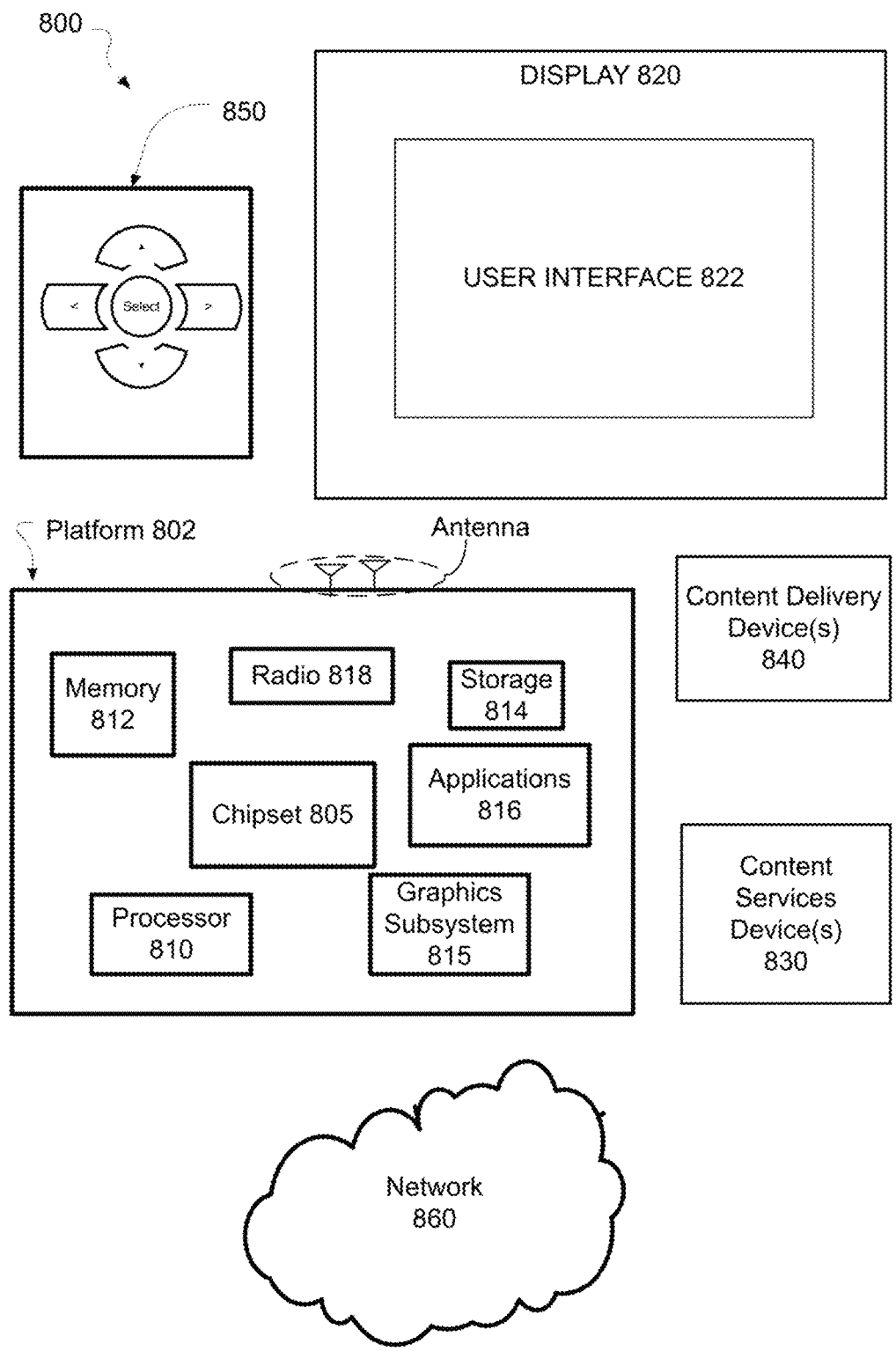
FIG. 8 is an illustrative diagram of another example system.

Referring to FIG. 8, an example system 800 in accordance with the present disclosure operates one or more aspects of the image processing system described herein. It will be understood from the nature of the system components described below that such components may be associated with, or used to operate, certain part or parts of the image processing systems described above including performance of a camera system operation described above. In various implementations, system 800 may be a media system although system 800 is not limited to this context. For example, system 800 may be incorporated into a digital video camera, mobile device with camera or video functions such as an imaging phone, webcam, personal computer (PC), remote server, laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example, and may or may not include an image signal processor (ISP). An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In implementations, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In implementations, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various implementations, platform 802 and display 820 may be an integrated unit. Display 820 and content service device(s) 830 may be integrated, or display 820 and content delivery device(s) 840 may be integrated, for example. These examples are not meant to limit the present disclosure.

In various implementations, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 8.

Referring to FIG. 9, a small form factor device 900 is one example of the varying physical styles or form factors in which systems 700 or 800 may be embodied. By this approach, device 700 may be implemented as a mobile computing device 900 having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone 914, or may be digitized by a voice recognition device. As shown, device 900 may include a camera 905 (e.g., including at least one lens, aperture, and imaging sensor) and a flash 910 integrated into back 902 (or elsewhere) of device 900. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

In example one or more first implementations, at least one non-transitory machine-readable medium comprising a plurality of instructions that in response to being executed on a computing device, cause the computing device to operate by: obtaining at least one image with at least one facial region; and recognizing multiple facial attributes on the at least one facial region using a neural network with at least two blocks each having at least one network layer, wherein one or more of the individual blocks have at least one individual layer with multiple kernels with varying sizes, and wherein one or more of the individual blocks perform at least one per-block fractional attention operation.

In one or more second implementations, and further to the first implementation, wherein the individual blocks are bottleneck blocks.

In one or more third implementations, and further to the first or second implementation, wherein at least one of the kernels is dilated to fit a larger size than the initial size of the kernel.

In one or more fourth implementations, and further to any of the first to third implementation, wherein the detecting comprises grouping channels into groups and providing at least two different kernels among the groups.

In one or more fifth implementations, and further to any of the first to third implementation, wherein the detecting comprises grouping channels into groups and providing at least two different kernels among the groups, wherein each group has a kernel of a different size.

In one or more sixth implementations, and further to any of the first to third implementation, wherein the detecting comprises grouping channels into groups and providing at least two different kernels among the groups, wherein the channels are grouped into 3 or 4 groups each with a different kernel.

In one or more seventh implementations, and further to any of the first to third implementation, wherein the detecting comprises grouping channels into groups and providing at least two different kernels among the groups, wherein the kernels comprise a 3×3 kernel, 5×5 kernel, and 3×3 kernel dilated to a 7×7 area by a dilation rate of 3.

In one or more eighth implementations, and further to any of the first to third implementation, wherein the detecting comprises grouping channels into groups and providing at least two different kernels among the groups, wherein the fractional attention comprises channel attention, spatial attention, or both.

In one or more ninth implementations, and further to any of the first to eighth implementation, wherein the detecting comprises having the at least one block perform both channel expansion and then contraction transformation and spatial contraction and then expansion transformation while using at least one of the individual blocks.

In example one or more tenth implementations, a computer-implemented neural network comprises a plurality of blocks operated by at least one processor and comprising at least one bottleneck block receiving block input features of image data and having at least one convolutional layer generating block output features that represent multiple attributes, wherein the at least one individual convolutional layer having multiple kernels with varying sizes applied to the input features; and at least one per-block fractional attention operation using a version of the block input features to generate weights to be applied to the block output features.

In one or more eleventh implementations, and further to the tenth implementation, wherein the individual blocks are bottleneck blocks.

In one or more twelfth implementations, and further to the tenth or eleventh implementation, wherein at least one of the kernels is dilated to fit a larger size than the initial size of the kernel.

In one or more thirteenth implementations, and further to any one of the tenth to twelfth implementation, wherein the detecting comprises grouping channels into groups and providing at least two different kernels among the groups.

In one or more fourteenth implementations, and further to any one of the tenth to twelfth implementation, wherein the detecting comprises grouping channels into groups and providing at least two different kernels among the groups, and wherein each group has a kernel of a different size.

In one or more fifteenth implementations, and further to the tenth implementation, wherein the fractional attention comprises channel attention, spatial attention, or both.

In one or more sixteenth implementations, and further to the tenth implementation, wherein the detecting comprises having the at least one block perform both channel expansion and then contraction transformation and spatial contraction and then expansion transformation while using at least one of the individual blocks.

In example one or more seventeenth implementations, a computer-implemented system comprises memory to store image data of images with faces and features of the images; and at least one processor communicatively coupled to the memory and being arranged to operate by: obtaining at least one image with at least one facial region; and detecting multiple facial attributes on the at least one facial region using a neural network with at least two blocks each having at least one network layer, wherein one or more of the individual blocks have at least one individual layer with multiple kernels with varying sizes, and wherein one or more of the individual blocks perform at least one per-block fractional attention operation.

In one or more eighteenth implementations, and further to the seventeenth implementation, wherein the detecting comprises grouping channels into groups and providing at least two different kernels among the groups.

In one or more nineteenth implementations, and further to the seventeenth or eighteenth implementation, wherein each group has a kernel of a different size.

In example one or more twentieth implementations, a method of image processing comprising: obtaining at least one image with at least one facial region; and detecting multiple facial attributes on the at least one facial region using a neural network with at least two blocks each having at least one network layer, wherein one or more of the individual blocks have at least one individual layer with multiple kernels with varying sizes, and wherein one or more of the individual blocks perform at least one per-block fractional attention operation.

In one or more twenty-first implementations, and further to the twentieth implementation, wherein the detecting comprises grouping channels into groups and providing a different kernel for each group.

In one or more twenty-second implementations, and further to the twentieth or twenty-first implementation, wherein the fractional attention comprises channel attention, spatial attention, or both.

In one or more twenty-third implementations, and further to any one of the twentieth to twenty-second implementation, wherein the detecting comprises having the at least one block perform both channel expansion and then contraction transformation and spatial contraction and then expansion transformation while using at least one of the individual blocks.

In one or more twenty-fourth implementations, and further to any one of the twentieth to twenty-third implementation, wherein the results of each group are concatenated together to form input channels of a next layer.

In one or more twenty-fifth implementations, and further to any one of the twentieth to twenty-fourth implementation, wherein a block of the at least two blocks is repeated at least four times.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. At least one non-transitory machine-readable medium comprising a plurality of instructions that in response to being executed on a computing device, cause the computing device to operate by:
   obtaining at least one image with at least one facial region; and
   detecting multiple facial attributes on the at least one facial region using a neural network with at least two blocks each having at least one network layer,
   wherein one or more individual blocks have at least one individual layer with multiple kernels with varying sizes,
   wherein one or more of the individual blocks perform at least one per-block fractional attention operation, and
   wherein the detecting includes having at least one block of the neural network perform both channel expansion and then contraction transformation and spatial contraction and then expansion transformation while using at least one of the individual blocks.

2. The medium of claim 1, wherein the individual blocks are bottleneck blocks.

3. The medium of claim 1, wherein at least one of the kernels is dilated to fit a larger size than an initial size of the kernel.

4. The medium of claim 1, wherein the detecting comprises grouping channels into groups and providing at least two different kernels among the groups.

5. The medium of claim 4, wherein each group has a kernel of a different size.

6. The medium of claim 4, wherein the channels are grouped into 3 or 4 groups each with a different kernel.

7. The medium of claim 4, wherein the kernels comprise a 3×3 kernel, 5×5 kernel, and 3×3 kernel dilated to a 7×7 area by a dilation rate of 3.

8. The medium of claim 4, wherein the fractional attention operation comprises channel attention, spatial attention, or both.

9. A computer-implemented neural network comprising:
   a plurality of blocks operated by at least one processor and comprising at least one bottleneck block receiving block input features of image data and having at least one convolutional layer generating block output features that represent multiple attributes, wherein the at least one convolutional layer having multiple kernels with varying sizes applied to the input features, at least one block of the plurality of blocks to detect multiple facial attributes by performing both channel expansion and then contraction transformation and spatial contraction and then expansion transformation using at least one of individual blocks; and
   at least one per-block fractional attention operation using a version of the block input features to generate weights to be applied to the block output features.

10. The network of claim 9 wherein the individual blocks are bottleneck blocks.

11. The network of claim 9, wherein at least one of the kernels is dilated to fit a larger size than an initial size of the kernel.

12. The network of claim 9, wherein the fractional attention comprises channel attention, spatial attention, or both.

13. A method of image processing comprising:
   obtaining at least one image with at least one facial region; and
   detecting multiple facial attributes on the at least one facial region using a neural network with at least two blocks each having at least one network layer,
   wherein one or more of individual blocks have at least one individual layer with multiple kernels with varying sizes,
   wherein one or more of the individual blocks perform at least one per-block fractional attention operation, and
   wherein the detecting includes having at least one block of the neural network perform both channel expansion and then contraction transformation and spatial contraction and then expansion transformation while using at least one of the individual blocks.

14. The method of claim 13, wherein the detecting comprises grouping channels into groups and providing a different kernel for each group.

15. The method of claim 13, wherein the fractional attention comprises channel attention, spatial attention, or both.

16. The method of claim 14, wherein results of each group are concatenated together to form input channels of a next layer.

17. The method of claim 13, wherein a block of the at least two blocks is repeated at least four times.

* * * * *